United States Patent [19]

Parker

[11] Patent Number: 5,546,799
[45] Date of Patent: Aug. 20, 1996

[54] DRAFT MONITORING DEVICE MOUNTED ON MOTOR VEHICLE TO DETERMINE WIND SPEED RELATIVE TO GROUND

[75] Inventor: Donald R. Parker, Largo, Fla.

[73] Assignee: Digital Control Corp., Largo, Fla.

[21] Appl. No.: 352,524

[22] Filed: Dec. 9, 1994

[51] Int. Cl.$^6$ ........................................... G01P 5/00
[52] U.S. Cl. ..................... 73/170.11; 73/170.14; 364/565
[58] Field of Search ............. 73/170.11–170.15; 364/565

[56] References Cited

U.S. PATENT DOCUMENTS

| | | |
|---|---|---|
| 3,585,859 | 6/1971 | DeLeo et al. . |
| 3,618,388 | 11/1971 | Rose . |
| 3,686,944 | 8/1972 | Mollick . |
| 3,719,337 | 3/1973 | Gardner ..................... 73/178 R X |
| 3,745,823 | 7/1973 | Hunter . |
| 4,987,542 | 1/1991 | Tran . |
| 5,091,871 | 2/1992 | Arethens . |
| 5,104,063 | 4/1992 | Hartley . |
| 5,119,673 | 6/1992 | Tran et al. . |
| 5,182,146 | 1/1993 | O'Hara . |
| 5,259,431 | 11/1993 | Housiaux . |

*Primary Examiner*—Richard Chilcot
*Assistant Examiner*—Joseph L. Felber
*Attorney, Agent, or Firm*—Pitts & Brittian, P.C.

[57] ABSTRACT

A draft monitoring device (10) for measuring and displaying the difference between the air speed and the ground speed of a motor vehicle (12). The draft monitoring device (10) includes a ground speed sensor (30) and an air speed sensor (46). Outputs from the ground speed sensor (30) and the air speed sensor (46) are compared to determine the direction and magnitude of the wind in the environment in which the vehicle (12) is being operated. The respective outputs are compared by a processor (64) carried within a housing (56) mounted inside the vehicle (12) in a position such that the driver of the vehicle (12) may easily view a display (68) carried thereon. The air speed sensor (46) is carried in a substantially undisturbed air stream on the front of the motor vehicle (12). The display panel (68) is provided for displaying the instantaneous, peak, and average headwind or tailwind.

20 Claims, 4 Drawing Sheets

DRAFT MONITORING DEVICE MOUNTED ON MOTOR VEHICLE TO DETERMINE WIND SPEED RELATIVE TO GROUND

TECHNICAL FIELD

This invention relates to the field of draft monitoring devices. More specifically, this invention is related to a device for monitoring the draft created by a lead vehicle such that a trailing vehicle can be maintained at a distance for achieving optimal gas mileage.

BACKGROUND ART

A draft created by a moving vehicle is a wake of air defining a series of cyclones spaced behind the vehicle. These cyclones, commonly referred to as vortices, increase or decrease the airspeed of a trailing vehicle. Vortices can be evidenced in some situations by dust that is swept into the vortices beside and behind a moving vehicle. An ill effect of a draft created by a lead vehicle is a reduction in fuel efficiency. Because a draft is not visually perceptible, a draft is often unnoticed by a driver. Thus, a draft can cause a reduction in fuel efficiency without the driver being aware of such reduction.

Significant fuel savings can be achieved by a trailing vehicle when the spacing between the trailing vehicle and the lead vehicle is such that a vortex is reducing headwinds as opposed to increasing the same. In order to ensure that an optimal spacing is achieved, a sensitive method of measuring and displaying the difference between the air speed and ground speed of the trailing vehicle is desired.

Several devices have been produced to measure and display air speed, especially in association with aircraft. Typical of the art are those devices disclosed in the following U.S. Pat. Nos.:

| U.S. Pat. No. | Inventor(s) | Issue Date |
|---|---|---|
| 3,585,859 | R. V. DeLeo, et al. | Jun 22, 1971 |
| 3,618,388 | R. E. Rose | Nov 9, 1971 |
| 3,686,944 | M. Mollick | Aug 29, 1972 |
| 3,745,823 | C. M. Hunter | Jul 17, 1973 |
| 4,987,542 | V. T. Tran | Jan 22, 1991 |
| 5,091,871 | J. P. Arethens | Feb 25, 1992 |
| 5,104,063 | J. M. Hartley | Apr 14, 1992 |
| 5,119,673 | V. T. Tran, et al. | Jun 9, 1992 |
| 5,182,146 | R. S. O'Hara | Jan 26, 1993 |
| 5,259,431 | R. J. Housiaux | Nov 9, 1993 |

Of these devices, those taught by DeLeo, et al. ('859), Rose ('388), Mollick ('944), and Hunter ('823) are provided for determining the airspeed of an aircraft. Such devices are not equipped to determine ground speed in order to determine a difference between the ground and air speeds for ultimately determining an ultimate spacing between a lead and a trailing vehicle.

Those devices taught by Tran ('542) and Tran, et al. ('673) are provided for determining the effects of crosswinds on a vehicle. Such devices are typically employed in the development of a particular body style of a vehicle such that the ill effects of crosswinds are reduced. These devices do not provide a driver with data to help increase fuel efficiency with respect to draft currents created by a leading vehicle.

O'Hara ('146) teaches a decorative air speed indicator. This device is placed on the hood of a vehicle and serves the dual function of a hood ornament and an air speed indicator. This device is not provided for comparing air and ground speeds for fuel efficiency purposes.

Arethens ('871) teaches a method for determining the mean wind speed with respect to the ground during the flight of an aircraft. This method does not determine ground speed, nor does is compare the determined air speed with the ground speed.

Finally, those devices taught by Hartley ('063) and Housiaux ('431) are provided for determining ground speed of an aircraft. These devices rotate the wheels associated with the landing gear at the determined ground speed such that when the aircraft touches down, skidding of the tires is minimized, thus extending the longevity of the tires and other components of the landing gear. These devices do not serve to compare air speed and ground speed.

Therefore, it is an object of this invention to provide a means for measuring a difference between the air speed and the ground speed of a motor vehicle.

It is also an object of the present invention to provide a means for displaying the determined difference between the air speed and the ground speed of the motor vehicle to the driver of the vehicle such that optimal spacing between a leading vehicle and a trailing vehicle with regard to fuel efficiency may be determined.

DISCLOSURE OF THE INVENTION

Other objects and advantages will be accomplished by the present invention which serves to measure and display the difference between the air speed and the ground speed of a motor vehicle. Moreover, the present invention serves to display the maximum tailwind or the minimum headwind detected such that the driver of the motor vehicle can maximize fuel efficiency.

The draft monitoring device of the present invention includes a ground speed sensor and an air speed sensor. Outputs from the ground speed sensor and the air speed sensor are compared to determine the direction and magnitude of in the environment in which the vehicle is being operated. The respective outputs are compared by a processor carried within a housing mounted inside the vehicle. The housing is positioned such that the driver of the vehicle may easily view a display carried thereon.

The ground speed sensor comprises at least one magnet secured to the drive shaft in a rear wheel drive vehicle or one of the front axles in a front wheel drive vehicle. A pick-up coil is provided for detecting each revolution of the drive shaft or axle by sensing the passing of the magnets. The ground speed sensor of the present invention may be substituted with the appropriate portion of a conventional cruise control system or with the output of a conventional digital speedometer such as the current Society of Automotive Engineers (SAE) standard 30,000 pulse/mile output.

The air speed sensor is carried in a substantially undisturbed air stream on the front of the motor vehicle. Typically, the air speed sensor is carried on the hood, roof, or side view mirror of the vehicle. A vacuum hose is connected between the air speed sensor and the housing.

The display panel is provided for displaying the instantaneous, peak, and average headwind or tailwind. Two bar graph display areas are provided for displaying the instantaneous and peak headwind or tailwind. A calibration switch is provided for insuring a proper reading. The average headwind or tailwind is displayed digitally. Individual indicators are illuminated to indicate whether the average wind speed displayed is a tailwind or a headwind.

BRIEF DESCRIPTION OF THE DRAWINGS

The above mentioned features of the invention will become more clearly understood from the following detailed description of the invention read together with the drawings in which.

BEST MODE FOR CARRYING OUT THE INVENTION

A draft monitoring device incorporating various features of the present invention is illustrated generally at 10 in the figures. The draft monitoring device, or device 10, is designed for measuring and displaying the difference between the air speed and the ground speed of a motor vehicle 12. Moreover, in the preferred embodiment the device 10 is designed to display the maximum tailwind or the minimum headwind detected such that the driver of the motor vehicle 12 can maximize fuel efficiency. The device 10 is further designed to display an average tailwind or headwind, depending upon the particular environment in which the motor vehicle 12 is operated.

Figure 1:
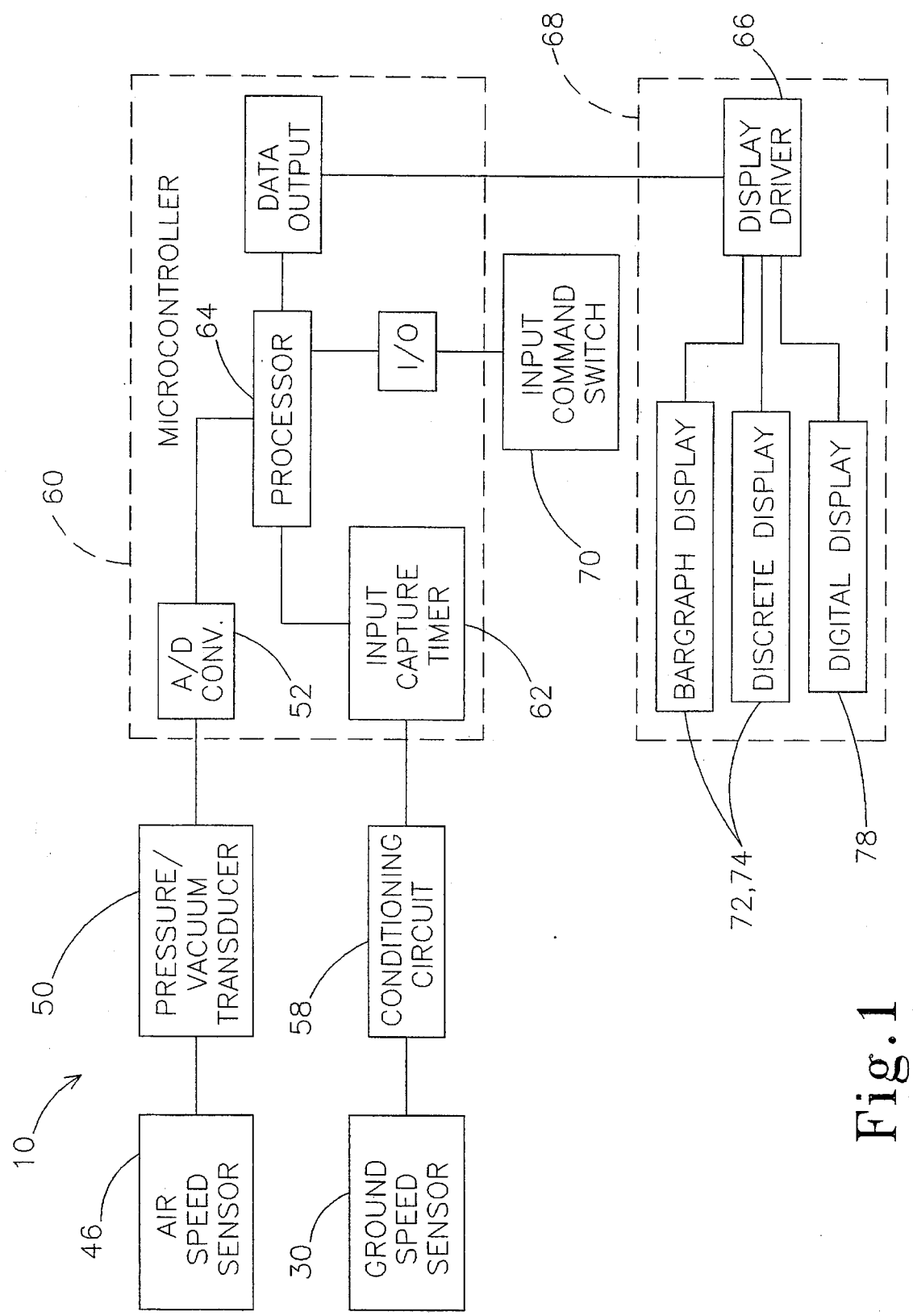
FIG. 1 is a schematic diagram illustrating the relationship between the individual components of a draft monitoring device constructed in accordance with several features of the present invention.

As illustrated in FIG. 1, the device 10 of the present invention includes a ground speed sensor 30 and an air speed sensor 46. The ground speed sensor 30 is more clearly illustrated in FIGS. 2 and 3 for two different types of transmissions. Output from the ground speed sensor 30 is filtered through a conditioning circuit 58 which performs a pulse shaping function. Output from the conditioning circuit 58 is input to the microcontroller 60 through an input capture timer 62.

Figure 4:
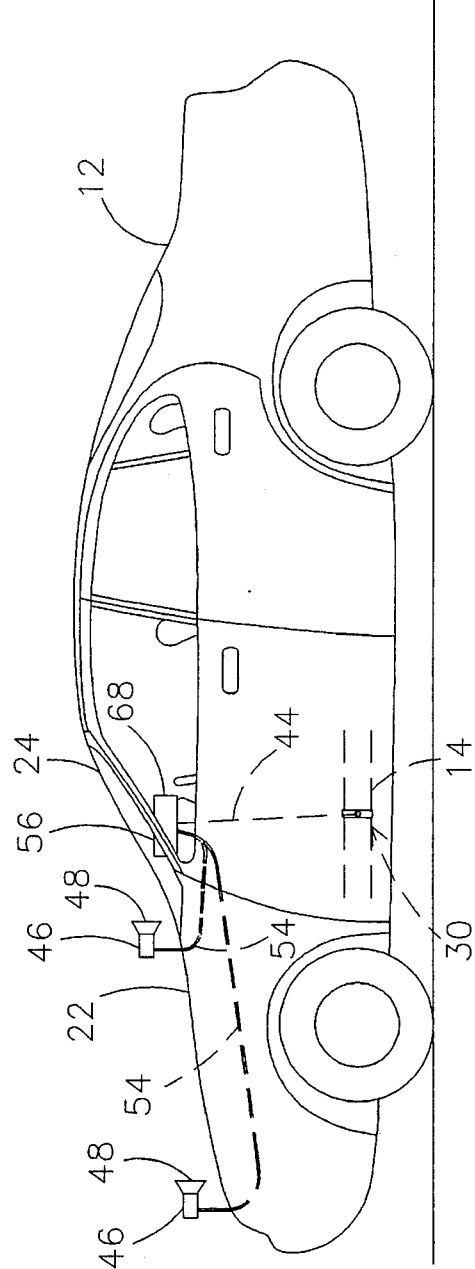
FIG. 4 illustrates an air speed sensor incorporated in the device of the present invention, the air speed sensor being shown in two potential mounting positions on an automobile.
Figure 5:
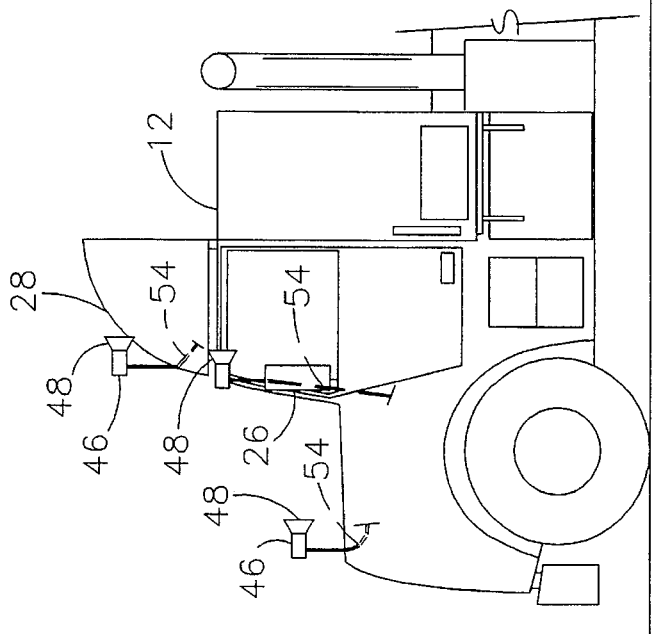
FIG. 5 illustrates an air speed sensor incorporated in the device of the present invention, the air speed sensor being shown in three potential mounting positions on a transfer truck.

The air speed sensor 46 is illustrated in FIGS. 4 and 5. The air speed sensor 46 consists of a Venturi air flow element 48 coupled to a transducer 50. The air flow element 48 creates a negative pressure, or a vacuum, dependent upon the velocity of the air flowing longitudinally over the motor vehicle 12. A greater air velocity creates a greater vacuum and a lesser velocity creates a lesser vacuum. Consequently, the transducer 50 of the present invention is a vacuum transducer. The transducer 50 is provided for converting the pressure or vacuum created by the flow element 48 to an electrical signal which input in the microcontroller 60 through an A/D converter 52.

Other alternate mechanizations for sensing air velocity are foreseeable. Therefore, it is not intended for the present invention to be limited to that described. For example, although not illustrated, it is envisioned that a pitot impact tube may be substituted for the Venturi air flow sensor 48, thus creating a positive pressure to be applied to the transducer 50.

Figure 6:
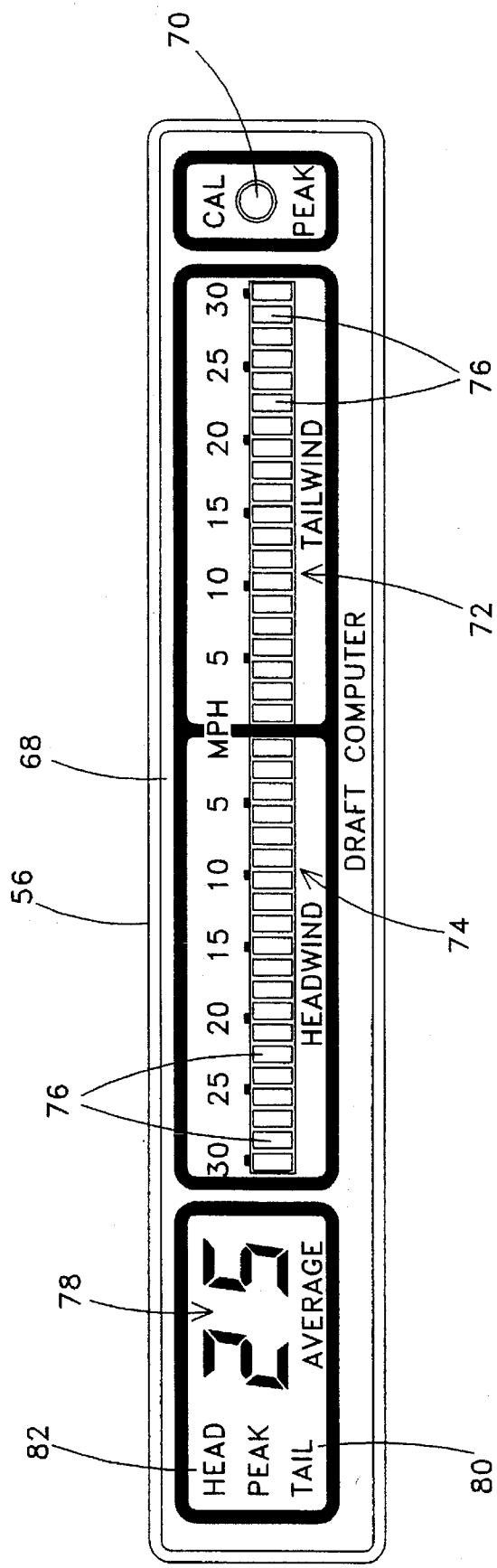
FIG. 6 illustrates a display unit used in conjunction with the present invention.

The filtered ground speed sensor signal and the digital signal derived from the air speed sensor 46 are compared using a processor 64 preferably resident in the microcontroller 60. The processor 64 serves to scale and linearize the air speed sensor input and to scale the ground speed sensor input. Further, the processor 64 serves to subtract the scaled inputs to determine an instantaneous output, to calculate an average value for the headwind or tailwind, and to record a maximum tailwind or minimum headwind. The instantaneous value for headwind or tailwind, the average headwind or tailwind, and the peak headwind or tailwind are each output to a display driver 66 and are ultimately displayed as illustrated in FIG. 6 on a display panel 68. A calibration switch 70, or input command switch, is provided for calibrating the device 10 for a particular vehicle 12. The functions of the calibration switch 70 are discussed more fully in the description associated with FIG. 6.

Figure 2:
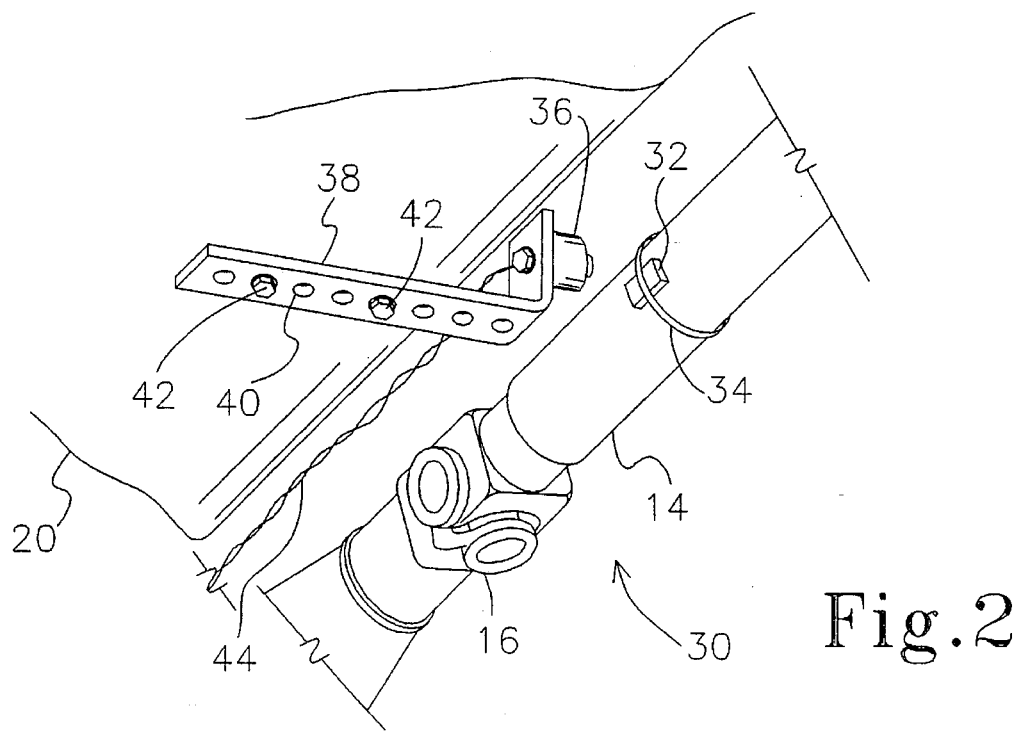
FIG. 2 illustrates a ground speed sensor incorporated in the device of the present invention, the illustrated ground speed sensor being illustrated for use on a rear wheel drive vehicle.
Figure 3:
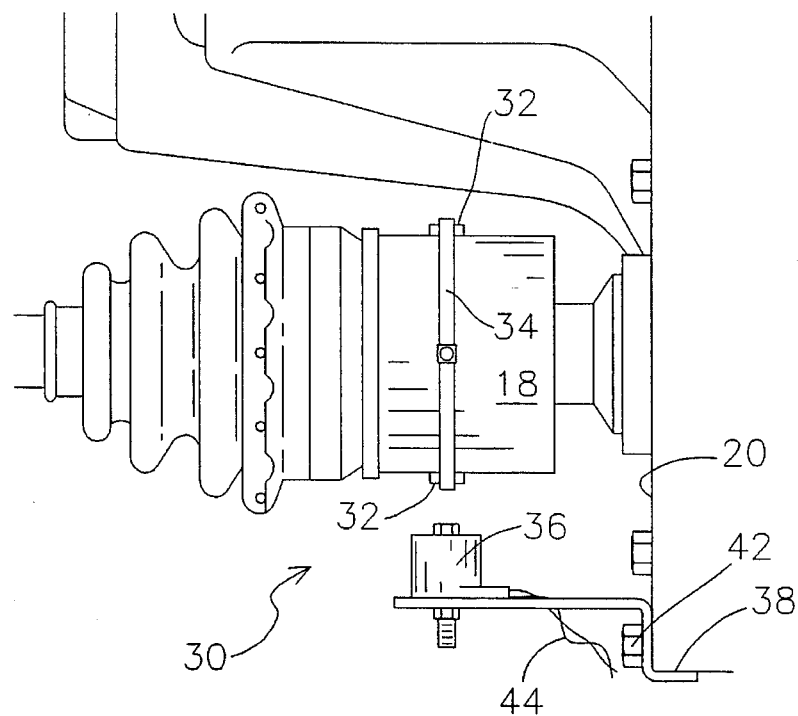
FIG. 3 illustrates a ground speed sensor incorporated in the device of the present invention, the illustrated ground speed sensor being illustrated for use on a front wheel drive vehicle.

Referring now to FIG. 2, a ground speed sensor 30 is illustrated for use with a rear wheel drive vehicle. At least one magnet 32 is secured to the drive shaft 14 of the vehicle 12. As illustrated, the preferred placement of the magnets 32 is to the rear of the front universal joint 16. In conjunction with a rear wheel drive vehicle, a single magnet 32 is typically used. However, as illustrated in FIG. 3, when the device 10 is used with a front wheel drive vehicle, it is preferred that two magnets 32 be disposed on opposite sides of either the left or right axle 18. Both magnets 32 are placed in the same plane of rotation for reasons described below. It will be understood, when reference is made hereinbelow to a magnet 32 secured to a drive shaft 14, that the use of more than one magnet 32 and the securement of those magnets 32 to an axle 18 of a front wheel drive vehicle is also anticipated. In either case, the magnets 32 are secured to the drive shaft 14 or axle 18 using a band 34 secured around the drive shaft 14, or axle 18, and the magnets 32. One conventional type of band 34 which has proven acceptable is a plastic hold-down strip having one end engageable in locking fashion within the opposite end, the one end being pulled through the other until a tight fit is accomplished. Of course, other conventional methods of securing the magnets 32 may be employed as well.

A pick-up coil 36 is secured to the vehicle floor pan 20 via a mounting bracket 38 and is positioned to interact with the magnets 32. Specifically, the pick-up coil 36 is disposed in the same plane of rotation of the magnets 32 such that as the drive shaft 14 is rotated during the operation of the vehicle 12, the magnets 32 are brought into close proximity to the pick-up coil 36, thus creating an electrical pulse at each revolution of the drive shaft 14. In the event that two magnets 32 are used, as in FIG. 3, two electrical pulses are generated with each revolution of the drive shaft 14. Preferably, a spacing between the pick-up coil 36 and the magnets at their closest point during rotation is between one-half and one inch (½" to 1"). The mounting bracket 38 of the preferred embodiment is fabricated from a malleable material and defines a plurality of openings 40 for receiving conventional fasteners Therefore, it will be seen that the mounting bracket 38 may be deformed to mount on virtually any vehicle floor pan 20. A pair of lead wires 44 is secured at one end to the pick-up coil 36 for communicating the electrical pulses to the conditioning circuit 58 described in association with FIG. 1. The lead wires 44 are connected at a further end to a housing 56 (see FIG. 4) which encloses the microcontroller 60 and carries the display panel 68 (see FIG. 6).

The ground speed sensor 30 used in the present invention is similar to those used in conventional cruise control devices. Therefore, it will be recognized that the ground speed sensor 30 of the present invention may be substituted with the appropriate portion of a cruise control system associated with the particular motor vehicle 12. Further, many motor vehicles 12 currently manufactured are equipped with digital speedometers. Therefore, it will also be understood that the output of the ground speed sensor 30 used in the present invention may be substituted with the digital output of the speedometer in such vehicles 12.

FIG. 4 illustrates an air speed sensor 46 carried in two locations on an automobile 12. Two air speed sensors 46 are shown to illustrate two preferred placements thereof. It will be understood that only one air speed sensor 46 is used in the preferred embodiment. Further, it will be understood that other placements may be effectively employed. However, for an accurate air speed reading, it is necessary to place the air speed sensor 46 in a substantially undisturbed air stream. In the illustrated embodiment, the primary placement of the air speed sensor 46 is on the hood 22 proximate the windshield 24 on the right side of the vehicle 12. A secondary placement of the air speed sensor 46 is shown in the position of a conventional hood ornament.

A vacuum hose 54 is connected between the air speed sensor 46 and the housing 56. The further end of the vacuum hose 54 is connected to the transducer 50, which is carried within the housing 56.

Illustrated in FIG. 5 is a transfer truck with an air speed sensor 46 shown mounted in three positions. Again, only one air speed sensor 46 is used in conjunction with the present invention, and the display of three air speed sensors 46 is merely illustrative of the potential dispositions thereof. The primary placement of the air speed sensor 46 on a transfer truck is on the mirror bracket 26 on the side of the door or on the top of the cab 28. A secondary location is shown to be in the center of the hood 22 toward the front of the truck.

Illustrated in FIG. 6 is a display panel 68 for displaying the instantaneous, peak, and average headwind or tailwind. Two bar graph display areas 72,74 are provided for displaying the instantaneous and peak headwind or tailwind. As illustrated, these are displayed in miles per hour (MPH). However, it will be understood that kilometers per hour (KPH) may be used as well. Each bar graph display 72,74 in the illustrated embodiment consists of a plurality of light emitting diodes (LED's) 76 which are illuminated in sequence depending upon the strength of the signal received by the transducer 50 and the A/D converter 52. The center of these two bar graphs 72,74 is zero. Increasing to the right of center is the tailwind display 72. Increasing to the left of center is the headwind display 74. The headwind or tailwind displayed is the result of the strength of the wind detected by the air speed sensor 46 minus the detected ground speed.

In order to insure a proper reading, the device 10 is calibrated at a selected vehicle ground speed in conditions where there is substantially no wind, that being either when the air is still or there is no net head or tailwind. For example, the device 10 may be calibrated in a 90° crosswind as well as in still air. A calibration switch 70 is provided for this purpose. In the preferred embodiment, the vehicle 12 is driven at a constant speed of fifty-five (55) MPH in still air, or where there is no net head or tailwind, for five (5) seconds while pressing the calibration switch 70. After calibration of the device 10, when there is no wind, the bar graph displays 72,74 will indicate no headwind or tailwind. Effectively, if the vehicle 12 is moving at 55 MPH when there is no wind, the air speed sensor 46 detects a headwind at 55 MPH. However, the ground speed sensor 30 determines that the vehicle 12 is moving along the ground 55 MPH. The processor 64 thus determines that the 55 MPH headwind detected by the air speed sensor 46 is a result of the ground speed of the vehicle 12 and thus displays 0 MPH headwind (or 0 MPH tailwind) as a result of sources other than the motion of the vehicle 12. When the wind begins to blow, or when a leading vehicle creates a draft, the direction of the effective wind is indicated as either a headwind or a tailwind and the magnitude of that wind is indicated by the number of individual LED's 76 illuminated.

For optimal fuel efficiency, the maximum tailwind or the minimum headwind is desired. When there is a tailwind, the tailwind effectively reduces the power required to motivate the vehicle 12. Therefore, a maximum tailwind is desirable. When the conditions create a headwind, the headwind effectively increases the power necessary to motivate the vehicle 12. Thus, it is desirable to minimize the effects of the headwind.

In order to determine what limits may be possible in the particular environment in which the device 10 is operated, the bar graph displays 72, 74 are provided with the capability of continuously illuminating the maximum tailwind or the minimum headwind experienced during operation of the vehicle 12. Specifically, the LED 76 associated with the peak condition illuminates when the condition is encountered and remains illuminated thereafter until a new peak condition is encountered at which time the LED 76 associated with the previous peak condition ceases illumination and another LED 76 associated with the new peak condition is illuminated. By displaying a peak condition, the driver of the vehicle 12 has a visual indication to use as a goal. In the preferred embodiment, the headwind and tailwind peak indication feature may be toggled ON and OFF by pressing the calibration switch 70 for a period of approximately one second. Other conventional means may be used to perform this function as well.

The average headwind or tailwind is displayed digitally as at 78 in the illustrated display 68. Individual indicators 80,82 are illuminated to indicate whether the average wind speed displayed is a tailwind, as with the indicator 80, or a headwind, as with the indicator 82. The processor 64 continually updates the average wind speed as the motor vehicle 12 is operated from the instant the device 10 is activated.

Although several types of indicators have been disclosed for displaying the instantaneous, peak, and average wind speeds, it will be understood that any other conventional devices for displaying such data may be used as well. Therefore, such disclosure is not intended to limit the present invention to such indicators.

From the foregoing description, it will be recognized by those skilled in the art that a draft monitoring device offering advantages over the prior art has been provided. Specifically, the draft monitoring device is designed for measuring and displaying the wind speeds associated with the operation of a motor vehicle. The device of the present invention displays the instantaneous, peak, and average wind speed, as well the direction of the wind (i.e., whether the wind is a headwind or a tailwind) such that a driver can optimize the distance between the vehicle and a leading vehicle in order to maximize fuel efficiency.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, I claim:

1. A device for monitoring wind conditions associated with the operation of a motor vehicle, said device comprising:

a ground speed sensor for detecting a speed of the motor vehicle with respect to the ground, said ground speed sensor outputting a first signal indicative of said vehicle ground speed;

an air speed sensor for detecting a first wind speed with respect to the motor vehicle during operation, said air speed sensor outputting a second signal indicative of said first wind speed; and a processor for comparing said first signal and said second signal to determine a second wind speed and a wind direction with respect to the ground proximate the location of the motor vehicle.

2. The device of claim 1 further comprising a display unit for displaying said second wind speed and said wind direction.

3. The device of claim 2 wherein said processor is further provided for determining a peak wind speed and a direction of wind at said peak wind speed, said display unit being further provided for displaying said peak wind speed and direction, said peak wind speed being a maximum wind speed when said direction associated with said peak wind speed is the direction of travel of the vehicle, and said peak wind speed being a minimum wind speed when said direction associated with said peak wind speed is opposed to the direction of travel of the vehicle.

4. The device of claim 2 wherein said processor is further provided for determining an average wind speed and a direction of wind at said average wind speed, said display unit being further provided for displaying said average wind speed and direction.

5. The device of claim 2 wherein said display unit is provided with a first meter and a second meter, said first meter for displaying said second wind speed when said wind direction is in the direction of travel of the vehicle and said second meter for displaying said second wind speed when said wind direction is opposed to the direction of travel of the vehicle, each of said first and second meters comprising a plurality of serially connected light emitting diodes illuminating from a first to a last of said plurality of light emitting diodes, the number of said plurality of light emitting diodes illuminated being dependant upon said second wind speed.

6. The device of claim 5 wherein said processor is further provided for determining a peak wind speed and a direction of wind at said peak wind speed, said display unit being further provided for displaying said peak wind speed and direction, said peak wind speed being displayed by illumination of one of said plurality of light emitting diodes comprising said first meter when said peak wind speed is a maximum in the direction of travel of the vehicle, said peak wind speed being displayed by illumination of one of said plurality of light emitting diodes comprising said second meter when said peak wind speed is a minimum in a direction opposed to the direction of travel of the vehicle.

7. The device of claim 1 wherein said air speed sensor includes an air flow sensor for sensing a vacuum associated with said first wind speed, said air speed sensor outputting said second signal in response to said vacuum sensed.

8. The device of claim 1 wherein said ground speed sensor includes at least one magnet secured to the drive shaft of the vehicle and a pickup coil carried by the under body of the vehicle, said pickup coil being positioned such that as the drive shaft is rotated, said at least one magnet is brought into close proximity to said pickup coil, said pickup coil thus generating said first signal as an electrical pulse to indicate one revolution of said at least one magnet about an axis of rotation of the drive shaft.

9. The device of claim 1 wherein said ground speed sensor includes at least one magnet secured to a front axle of the vehicle and a pickup coil carried by the under body of the vehicle, said pickup coil being positioned such that as the front axle is rotated, said at least one magnet is brought into close proximity to said pickup coil, said pickup coil thus generating said first signal as an electrical pulse to indicate one revolution of said at least one magnet about an axis of rotation of the front axle.

10. A device for monitoring wind conditions associated with the operation of a motor vehicle, said device comprising:

a ground speed sensor for detecting a speed of the motor vehicle with respect to the ground, said ground speed sensor outputting a first signal indicative of said vehicle ground speed;

an air speed sensor for detecting a first wind speed with respect to the motor vehicle during operation, said air speed sensor outputting a second signal indicative of said first wind speed;

a processor for comparing said first signal and said second signal to determine a second wind speed and a wind direction with respect to the ground proximate the location of the motor vehicle, for determining a peak wind speed and a direction of wind at said peak wind speed, and for determining an average wind speed and a direction of wind at said average wind speed, said peak wind speed being a maximum wind speed when said direction associated with said peak wind speed is the direction of travel of the vehicle, and said peak wind speed being a minimum wind speed when said direction associated with said peak wind speed is opposed to the direction of travel of the vehicle; and a display unit for displaying said second wind speed and said wind direction, for displaying said peak wind speed and direction, and for displaying said average wind speed and direction.

11. The device of claim 9 wherein said display unit is provided with a first meter and a second meter, said first meter for displaying said second wind speed when said wind direction is in the direction of travel of the vehicle and said second meter for displaying said second wind speed when said wind direction is opposed to the direction of travel of the vehicle, each of said first and second meters comprising a plurality of serially connected light emitting diodes illuminating from a first to a last of said plurality of light emitting diodes, the number of said plurality of light emitting diodes illuminated being dependant upon said second wind speed, said peak wind speed being displayed by illumination of one of said plurality of light emitting diodes comprising said first meter when said peak wind speed is a maximum in the direction of travel of the vehicle, said peak wind speed being displayed by illumination of one of said plurality of light emitting diodes comprising said second meter when said peak wind speed is a minimum in a direction opposed to the direction of travel of the vehicle.

12. The device of claim 10 wherein said air speed sensor includes an air flow sensor for sensing a vacuum associated with said first wind speed, said air speed sensor outputting said second signal in response to said vacuum sensed.

13. The device of claim 10 wherein said ground speed sensor includes at least one magnet secured to the drive shaft of the vehicle and a pickup coil carried by the under body of the vehicle, said pickup coil being positioned such that as the drive shaft is rotated, said at least one magnet is brought into close proximity to said pickup coil, said pickup coil thus generating said first signal as an electrical pulse to indicate one revolution of said at least one magnet about an axis of rotation of the drive shaft.

14. The device of claim 10 wherein said ground speed sensor includes at least one magnet secured to a front axle of the vehicle and a pickup coil carried by the under body of the vehicle, said pickup coil being positioned such that as the front axle is rotated, said at least one magnet is brought into close proximity to said pickup coil, said pickup coil thus generating said first signal as an electrical pulse to indicate one revolution of said at least one magnet about an axis of rotation of the front axle.

15. A device for monitoring wind conditions associated with the operation of a motor vehicle, said device comprising:

a ground speed sensor for detecting a speed of the motor vehicle with respect to the ground, said ground speed sensor outputting a first signal indicative of said vehicle ground speed;

an air speed sensor for detecting a first wind speed with respect to the motor vehicle during operation, said air speed sensor outputting a second signal indicative of said first wind speed;

a processor for comparing said first signal and said second signal to determine a second wind speed and a wind direction with respect to the ground proximate the location of the motor vehicle; and a display unit for displaying said second wind speed and said wind direction, said display unit being provided with a first meter and a second meter, said first meter for displaying said second wind speed when said wind direction is in the direction of travel of the vehicle and said second meter for displaying said second wind speed when said wind direction is opposed to the direction of travel of the vehicle, each of said first and second meters comprising a plurality of serially connected light emitting diodes illuminating from a first to a last of said plurality of light emitting diodes, the number of said plurality of light emitting diodes illuminated being dependant upon said second wind speed.

16. The device of claim 15 wherein said processor is further provided for determining a peak wind speed and a direction of wind at said peak wind speed, said display unit being further provided for displaying said peak wind speed and direction, said peak wind speed being displayed by illumination of one of said plurality of light emitting diodes comprising said first meter when said peak wind speed is a maximum in the direction of travel of the vehicle, said peak wind speed being displayed by illumination of one of said plurality of light emitting diodes comprising said second meter when said peak wind speed is a minimum in a direction opposed to the direction of travel of the vehicle.

17. The device of claim 15 wherein said processor is further provided for determining an average wind speed and a direction of wind at said average wind speed, said display unit being further provided for displaying said average wind speed and direction.

18. The device of claim 15 wherein said air speed sensor includes an air flow sensor for sensing a vacuum associated with said first wind speed, said air speed sensor outputting said second signal in response to said pressure sensed.

19. The device of claim 15 wherein said ground speed sensor includes at least one magnet secured to the drive shaft of the vehicle and a pickup coil carried by the under body of the vehicle, said pickup coil being positioned such that as the drive shaft is rotated, said at least one magnet is brought into close proximity to said pickup coil, said pickup coil thus generating said first signal as an electrical pulse to indicate one revolution of said at least one magnet about an axis of rotation of the drive shaft.

20. The device of claim 15 wherein said ground speed sensor includes at least one magnet secured to a front axle of the vehicle and a pickup coil carried by the under body of the vehicle, said pickup coil being positioned such that as the front axle is rotated, said at least one magnet is brought into close proximity to said pickup coil, said pickup coil thus generating said first signal as an electrical pulse to indicate one revolution of said at least one magnet about an axis of rotation of the front axle.

* * * * *